United States Patent
Verma et al.

(10) Patent No.: US 12,093,212 B2
(45) Date of Patent: Sep. 17, 2024

(54) EXTERNAL QUIESCE OF A CORE IN A MULTI-CORE SYSTEM

(71) Applicant: Ampere Computing LLC, Santa Clara, CA (US)

(72) Inventors: Neerbhee Verma, Vancouver, WA (US); Gerardo Fernandez, Beaverton, OR (US); Harb Abdulhamid, Raleigh, NC (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/932,613

(22) Filed: Sep. 15, 2022

(65) Prior Publication Data

US 2024/0095208 A1    Mar. 21, 2024

(51) Int. Cl.
*G06F 15/78* (2006.01)
*G06F 11/27* (2006.01)

(52) U.S. Cl.
CPC .......... *G06F 15/7882* (2013.01); *G06F 11/27* (2013.01)

(58) Field of Classification Search
CPC .............................. G06F 15/7882; G06F 11/27
See application file for complete search history.

(56) References Cited

U.S. PATENT DOCUMENTS

| | | | | |
|---|---|---|---|---|
| 9,128,849 B2* | 9/2015 | Hendry | ............... | G06F 12/0835 |
| 11,036,543 B1* | 6/2021 | Swanson | ............... | G06F 13/102 |
| 11,327,918 B2* | 5/2022 | Chen | ................... | G06F 11/2038 |
| 11,734,017 B1* | 8/2023 | Brinkmann | ........... | G06F 9/4881 712/220 |
| 2004/0006670 A1* | 1/2004 | Yoshida | .............. | G06F 12/0804 711/E12.04 |
| 2008/0077813 A1* | 3/2008 | Keller | ................... | G06F 1/3203 713/320 |
| 2008/0282100 A1* | 11/2008 | Chen | .................... | G06F 1/3203 713/322 |
| 2010/0299541 A1* | 11/2010 | Ishikawa | ............... | G06F 9/4893 713/300 |
| 2013/0055281 A1* | 2/2013 | Miwa | .................... | G06F 1/3287 718/104 |
| 2015/0058682 A1* | 2/2015 | Nagumo | ............. | G06F 11/0724 714/47.3 |
| 2016/0147534 A1* | 5/2016 | Lewis | ................. | G06F 12/0875 712/216 |
| 2016/0179611 A1* | 6/2016 | Le | ....................... | G06F 11/1012 714/763 |
| 2019/0007216 A1* | 1/2019 | Meriac | .................... | G06F 21/572 |
| 2021/0294641 A1* | 9/2021 | Kirubakaran | ....... | G06F 11/3024 |
| 2022/0171694 A1* | 6/2022 | Haldeman | ........... | G06F 9/30098 |
| 2022/0318109 A1* | 10/2022 | Colombo | ............. | G06F 11/079 |

* cited by examiner

*Primary Examiner* — Matthew M Kim
*Assistant Examiner* — Matthew N Putaraksa
(74) *Attorney, Agent, or Firm* — Muncy, Geissler, Olds & Lowe, P.C.

(57) ABSTRACT

Disclosed are techniques for external quiesce of a core in a multi-core system. In some aspects, a method for external quiesce of a core in a multi-core system-on-chip (SoC), comprises, at control circuitry for the multi-core SoC, receiving an indication that a core in a multi-core SoC should be quiesced, determining that the core should be externally quiesced, and asserting an external quiesce request input into the core.

36 Claims, 4 Drawing Sheets

EXTERNAL QUIESCE OF A CORE IN A MULTI-CORE SYSTEM

BACKGROUND

I. Field of the Disclosure

Aspects of the disclosure relate generally to the management of multiple processor cores, and specifically to the management of multiple processor cores in a multi-core system-on-chip (SoC).

II. Background

Cloud data centers are memory, storage, and processing resources that are available to a consumer/customer via the Internet or another type of network. Multicore SoCs provide economies of scale to cloud data centers due to the fact that multicore SoCs can support large numbers of processes or processor threads in a compact and power-efficient package. The term "node" generally refers to a collection of such resources, and as used herein, the term "node" may refer specifically to one SoC or to a cluster of SoCs. Thus, a cloud data center typically has multiple nodes, which may be co-located together in one facility, distributed across disparate facilities (which themselves may or may not be geo-spatially diverse), or a combination of the above.

One metric of reliability is called the annual interrupt rate (AIR), which some cloud data center vendors define as the projected number of reboots or other events, such as performance drops and process pauses, that a customer will experience if they rent 100 VMs and run them for a year (or rent one VM and run it for 100 years; what matters is the VM-years). Customers may want or need a low AIR, and this translates to a need of recoverability and survivability of most typical fatal errors, which normally would result in a system "crash" today.

While multi-core SoCs are attractive because of their economy of scale and large processing capabilities, as more and more cores are contained with a larger and larger SoC, a fatal error condition on one core can potentially affect a larger number of other cores, which affects all of the other processes or threads that are running on the other cores. The number of other cores that are affected by the failure of one core is colloquially referred to as the "blast radius." As core count per system increases, the number of virtual machines (VM) per node increases, and thus the workload per node increases, which increases the impact of fatal errors that trigger a reboot of the system. Thus, as SoCs scale larger, the blast radius also becomes larger, and thus fatal error conditions that require rebooting of the entire system on that SoC have a greater negative impact. Further, while a working core may perform a synchronous operation to take itself offline, an inoperative core cannot perform such as synchronous operation, which may eventually lead to an OS error and a reboot of the entire SoC and all of the processes that were running on it.

Accordingly, there is a need for techniques by which an inoperative core in a multi-core SoC can be gracefully forced into an offline state in a manner that avoids the kind of situations that result in a reboot of the entire SoC.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for external quiesce of a core in a multi-core system-on-chip (SoC), the method comprising, at control circuitry for the SoC: receiving an indication that a core in a multi-core SoC should be quiesced; determining that the core should be externally quiesced; and asserting an external quiesce request input into the core.

In an aspect, a method for external quiesce of a core in a multi-core SoC, the method comprising, at a core in the multi-core SoC: detecting a condition that may require the core to be quiesced; providing, to an external entity, an indication of the condition; receiving an external quiesce request; and in response to receiving the external quiesce request, performing an asynchronous quiesce process.

In an aspect, an apparatus for external quiesce of a core in a multi-core SoC includes a plurality of processor cores; control circuitry for performing a control function; and a mesh interconnect communicatively coupled to the plurality of processor cores and the control circuitry; wherein the control circuitry is configured to: receive an indication that a core from the plurality of processor cores should be quiesced; determine that the core should be externally quiesced; and assert an external quiesce request input into the core.

In an aspect, an apparatus for external quiesce of a core in a multi-core SoC includes a plurality of processor cores; control circuitry for performing a control function; and a mesh interconnect communicatively coupled to the plurality of processor cores and the control circuitry; wherein a core of the plurality of processor cores is configured to: detect a condition that may require the core to be quiesced; provide, to the control circuitry, an indication of the condition; receive an external quiesce request; and in response to receiving the external quiesce request, perform an asynchronous quiesce process.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION OF THE DRAWINGS

Disclosed are techniques for external quiesce of a core in a multi-core system. In some aspects, a method for external quiesce of a core in a multi-core system-on-chip (SoC), comprises, at control circuitry for the multi-core SoC, receiving an indication that a core in a multi-core SoC should be quiesced, determining that the core should be externally quiesced, and asserting an external quiesce request input into the core.

Cloud data centers are memory, storage, and processing resources that are available to a consumer/customer via the Internet or another type of network. Multicore SoCs provide economies of scale to cloud data centers due to the fact that multicore SoCs can support large numbers of processes or processor threads in a compact and power-efficient package. The term "node" generally refers to a collection of such resources, and as used herein, the term "node" may refer specifically to one SoC or to a cluster of SoCs. Thus, a cloud data center typically has multiple nodes, which may be co-located together in one facility, distributed across disparate facilities (which themselves may or may not be geospatially diverse), or a combination of the above.

One metric of reliability is called the annual interrupt rate (AIR), which some cloud data center vendors define as the projected number of reboots or other events, such as performance drops and process pauses, that a customer will experience if they rent 100 VMs and run them for a year (or rent one VM and run it for 100 years; what matters is the VM-years). Customers may want or need a low AIR, and this translates to a need of recoverability and survivability of most typical fatal errors, which normally would result in a system "crash" today.

While multi-core SoCs are attractive because of their economy of scale and large processing capabilities, as more and more cores are contained with a larger and larger SoC, a fatal error condition on one core can potentially affect a larger number of other cores, which affects all of the other processes or threads that are running on the other cores. The number of other cores that are affected by the failure of one core is colloquially referred to as the "blast radius." As core count per system increases, the number of virtual machines (VM) per node increases, and thus the workload per node increases, which increases the impact of these fatal errors that result in reboot of the system. Thus, as SoCs scale larger, the blast radius also becomes larger, and thus fatal error conditions that require rebooting of the entire system on that SoC have a greater negative impact.

In a conventional SoC, there are mechanisms by which a core may take itself "off-line," meaning that the core is not performing any tasks and is instead quiescent. This may be done in order to save power when that particular core's processing capability is not needed or when the core itself detects an error condition and determines that to continue operating may give rise to a potentially severe, or even fatal, error condition. "Off-lining" a core is a process that includes not only halting operation of the core but may also include other clean-up tasks, such as flushing caches, clearing cache states, disconnecting the core from a coherency network, removing the core from coherency tracking, and removing the core from a core scheduling pool maintained by the operating system (OS).

In a conventional SoC, offlining a core is accomplished by the OS initiating a sequence of instructions to be executed by the core to be off-lined. One example is the ARM™ Power State Coordination Interface (PSCI) "CPU_OFF" sequence. When the core takes itself off-line via instructions that it executes, this is referred to as a synchronous flow.

In conventional SoCs, physical cores may be gracefully taken offline from a cluster only through synchronous flows, where "gracefully" means in manner that allows the core to perform the clean-up tasks described above or otherwise off-line itself in a manner that does not have a negative impact on the other cores. An "ungraceful" exit by a physical core, e.g., due to a hardware failure, an OS exception, etc., may cause a cascade of other data or processing errors in other cores and/or may cause the OS to need to perform a system reboot to recover from the error.

However, in cases where a fatal hardware error in a physical core prevents further execution, the affected core may not have the ability to execute the normal core offline synchronous flow. In these cases, OS software would eventually crash (e.g. due to a software watchdog timeouts due to the core being unresponsive), causing the entire SoC to perform a reboot or other initialization sequence. Thus, there is a need for a mechanism by which a failing core can be off-lined by an external entity (e.g., hardware and/or firmware) and where a synchronous flow may not be available.

Accordingly, methods and systems for quiescing a core by an external entity are herein presented. This mechanism, referred to herein as an external quiesce, provides a way for an external entity (e.g., hardware and/or firmware) to gracefully terminate the executing thread on the failing physical core. In some aspects, external quiesce also enables software to gracefully offline the failing physical core from further scheduling by removing it from the scheduler pool. In some aspects, this is accomplished asynchronously by a combination of firmware and hardware external quiesce flows.

For the purposes of illustration only, the term "quiesce" as used herein refers to cleaning a core (e.g., including a write-back of dirty data) and detaching the core from the coherency network, and the term "external quiesce" (ExtQ) refers to a hook for on-demand core cleanup core detachment from the coherency network when the core itself cannot execute instructions.

Figure 1:
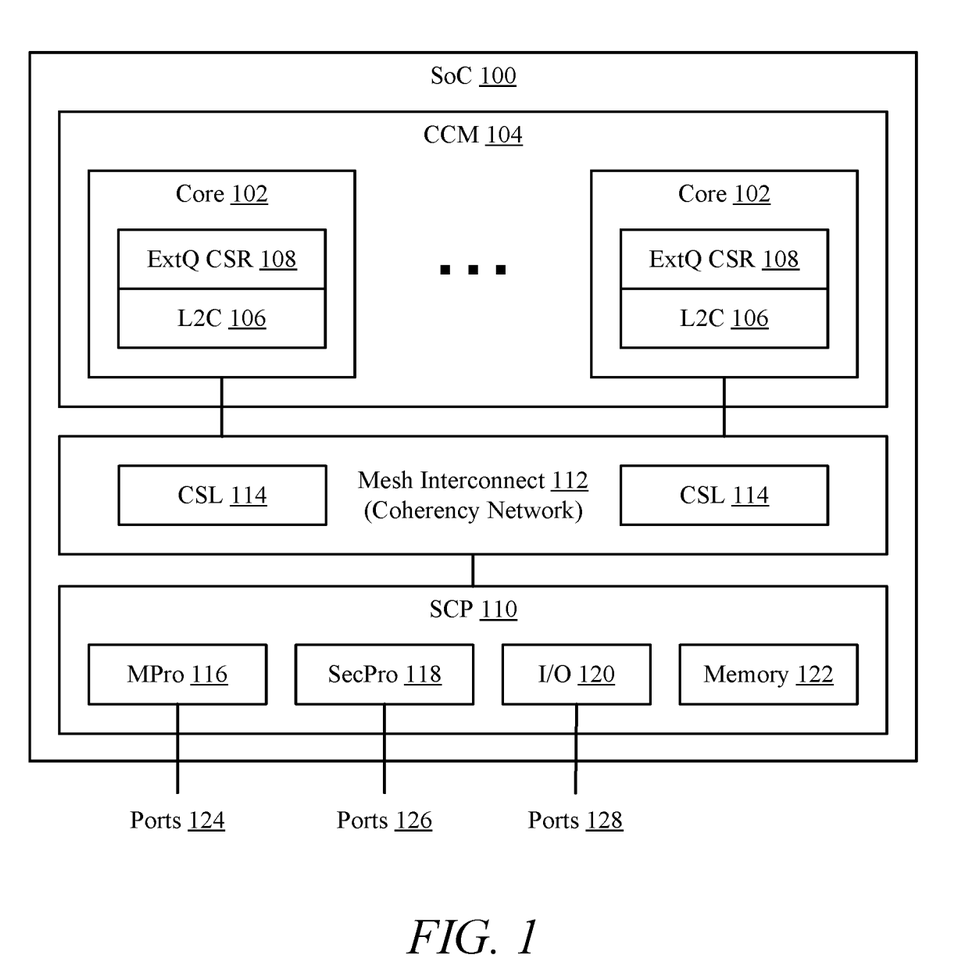
FIG. 1 is a diagram of a multi-core SoC that supports external quiesce according to aspects of the disclosure.

FIG. 1 is a diagram of a multi-core system on a chip (SoC) 100 that supports external quiesce, according to aspects of the disclosure. The SoC 100 illustrated in FIG. 1 includes a set of processing cores 102 (or simply "cores" 102) within a core cluster module (CCM) 104. The SoC 100 may include more or less than the illustrated number of cores 102. In the example illustrated in FIG. 1, each core 102 includes a level-2 cache (L2C) 106 and an external quiesce (ExtQ) control and status register (CSR) 108, the purpose of which will be explained in more detail below.

The SoC 100 also includes a system control processor (SCP) 110 that handles many of the system management functions of the SoC 100. The cores 102 are connected to the SCP 110 via a mesh interconnect 112 that forms a high speed bus that couples each of core 102 to the other cores 102 and to other on chip and off-chip resources, including higher levels of memory (e.g., a level three (L3) cache, dual data rate (DDR) memory), peripheral component interconnect express (PCIe) interfaces, and/or other resources. In the example SoC 100 illustrated in FIG. 1, each core 102 has associated cache snoop logic (CSL) 114.

The SCP 110 may include a variety of system management functions, which may be divided across multiple functional blocks or which may be contained in a single functional block. In the example illustrated in FIG. 1, the system management functions of the SCP 110 are divided over a management processor (MPro) 116 and a security processor (SecPro) 118 coupled to other components of the SoC 100 by the mesh interconnect 112. The SoC 100, the MPro 116, and the SecPro 118 may each include joint test action group (JTAG) ports and firmware, which may be connected to other components within the SoC 100 via the mesh interconnect 112, an inter-integrated circuit (I2C)

interface, or other connection. In the example illustrated in FIG. 1, the SCP 110 further includes an input/output (I/O) block 120 and an on-board shared memory 122 also coupled to other components of the SoC 100 by the mesh interconnect 112. Note that although FIG. 1 illustrates the MPro 116 and the SecPro 118 as separate microcontrollers (or processors), as will be appreciated, they may be combined into one or two microcontrollers, or sub-divided into more than two microcontrollers.

The MPro 116 and the SecPro 118 may include a bootstrap controller and an I2C controller or other bus controller. The MPro 116 and the SecPro 118 may communicate with on-chip sensors, an off-chip baseboard management controller (BMC), and/or other external systems to provide control signals to external systems. The MPro 116 and the SecPro 118 may connect to one or more off-chip systems as well via ports 124 and ports 126, respectively, and/or may connect to off-chip systems via the I/O block 120, e.g., via ports 128.

The MPro 116 performs error handling and crash recovery for the cores 102 of the SoC 100 and performs power failure detection, recovery, and other fail safes for the SoC 100. The MPro 116 performs the power management for the SoC 100 and may connect to one or more voltage regulators (VR) that provide power to the SoC 100. The MPro 116 may receive voltage readings, power readings, and/or thermal readings and may generate control signals (e.g., dynamic voltage and frequency scaling (DVFS)) to be sent to the voltage regulators. The MPro 116 may also report power conditions and throttling to an operating system (OS) or hypervisor running on the SoC 100. The MPro 116 may provide the power for boot up and may have specific power throttling and specific power connections for boot power to the SCP 110 and/or the SecPro 118. The MPro 116 may receive power or control signals, voltage ramp signals, and other power control from other components of the SCP 110, such as the SecPro 118, during boot up as hardware and firmware become activated on the SoC 100. These power-up processes and power sequencing may be automatic or may be linked to events occurring at or detected by the MPro 116 and/or the SecPro 118. The MPro 116 may connect to the shared memory 122, the SecPro 118, and external systems (e.g., VRs) via ports 124, and may supply power to each via power lines.

The SecPro 118 manages the boot process and may include on-board read-only memory (ROM) or erasable programmable ROM (EPROM) for safely storing firmware for controlling and performing the boot process. The SecPro 118 also performs security sensitive operations and only runs authenticated firmware. More specifically, the components of the SoC 100 may be divided into trusted components and non-trusted components, where the trusted components may be verified by certificates in the case of software and firmware components, or may be pure hardware components, so that at boot time, the SecPro 118 may ensure that the boot process is secure.

The shared memory 122 may be on-board random-access memory (RAM) or secured RAM that can be trusted by the SecPro 118 after an integrity check or certificate check. The I/O block 120 may connect over ports 128 to external systems and memory (not shown) and connect to the shared memory 122. The SCP 110 may use the I/O connections of the I/O block 120 to interface with a BMC or other management system(s) for the SoC 100 and/or to the network of the cloud platform (e.g., via gigabit ethernet, PCIe, or fiber). The SCP 110 may perform scaling, balancing, throttling, and other control processes to manage the cores 102, associated memory controllers, and mesh interconnect 112 of the SoC 100.

In some aspects, the mesh interconnect 112 is part of a coherency network. There are points of coherency somewhere in the mesh network depending on the address and target memory. A coherency network typically includes control registers, status registers, and state machines, and in the example illustrated in FIG. 1, these are initialized by the MPro 116, e.g., based on system and memory configuration, and the MPro 116 monitors the coherency domain for errors.

In some aspects, the external quiesce control and status register, ExtQ CSR 110, provides the entry point by which an external entity, such as the MPro 116, for example, to initiate an external quiesce. For example, the external entity may trigger an external quiesce by writing a specific value to one or more specific control bits within the ExtQ CSR 110. In some aspects, control logic within the ExtQ CSR 110 detects that the specific values are present within the one or more specific bits and, in response, may activate logic within core 102. In some aspects, the logic within the core 102 may be the same logic that would have been activated by instructions executed by an operative core 102 during a synchronous offlining flow. As such, the existing circuitry for offlining a core 102 may be reused by the external quiesce process. In some aspects, the core 102 may include additional circuitry that performs a sequence of operations that would otherwise been performed by an operative core 102 during a synchronous offlining flow, but is instead performed by the additional circuitry. Examples of operations performed include, but are not limited to, clearing dirty cache entries, triggering changes of states in FSM, changing register values, disconnecting the core 102 from the coherency network, and so on. In some aspects, the additional circuitry may update status bits in the ExtQ CSR 110 to reflect the completion of these operations. For example, the ExtQ CSR 110 may include one or more status bits that indicate that the core 102 has been quiesced. In some aspects, other status bits may be used to indicate various aspects of the quiesce process, e.g., to indicate that the dirty cache entries were successfully cleared, to indicate that the core 102 has been disconnected from the coherency network, etc.

Figure 2:
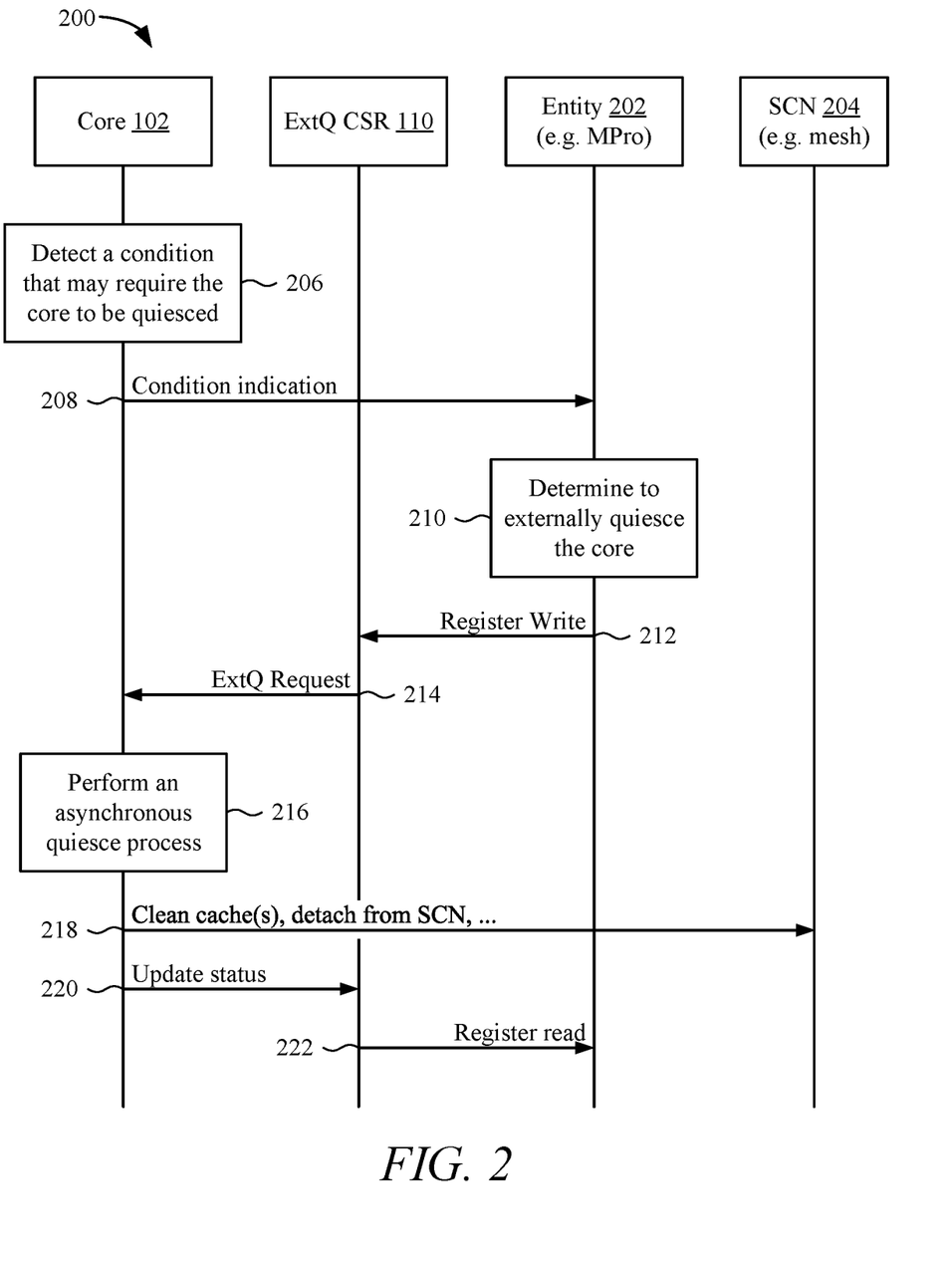
FIG. 2 is a signaling and event diagram showing a process for external quiesce, according to aspects of the disclosure.

FIG. 2 is a signaling and event diagram showing a process 200 for external quiesce, according to aspects of the disclosure. The process 200 illustrated in FIG. 2 involves a core 102 and an ExtQ control/status register (CSR) 110 associated with that particular core (e.g., one of the cores 102 in FIG. 1), an external entity 202 (e.g., the MPro 116 in FIG. 1), and a system coherency network (SCN) 204 (e.g., the mesh interconnect 112 in FIG. 1). The core 102, the ExtQ CSR 110, the mesh interconnect 112, and the MPro 116 are substantially similar to the like-numbered elements in FIG. 1, and thus their descriptions will not be repeated here.

In the example shown in FIG. 2, at block 206, the core 102 detects a condition that may require the core 102 to be quiesced and, at block 208, notifies the external entity 202 of that condition, e.g., via an indication signal or message, or by changing a value in a status register associated with the core 102, such as ExtQ CSR 110. In some aspects, each core 102 may have one or more error signals that are sent to the MPro 116 through the CCM 104, over the mesh interconnect 112, through the SCP 110, and to the MPro 116. For example, during execution, a physical core 102 can encounter a fatal error (e.g. an L2C 106 tag error or register file parity error), or at any point cease execution and fail to make progress, e.g., such as a micro-architectural hang state, where the core 102 enters some illegal state that makes the core 102 "stuck" with no ability to move forward. In some aspects, the core 102 may set status bits within the core 102 or within the CCM 104 to indicate the detection of all errors (or of certain types of errors).

In this manner, the external entity 202 may be notified of the error condition by such detection logic, and once notified, the external entity 202 may use external quiesce to terminate (and potentially reset) the failing core through the control mechanism provided by the external quiesce flow. In some aspects, external quiesce involves gracefully removing a core from the system by flushing/clearing state and dirty data, eventually removing the core from coherency tracking so that it will no longer be snooped or interrupted (i.e., an unwakeable state of core).

In the example shown in FIG. 2, at block 210, the external entity 202 determines that the core should be quiesced. In some aspects, this determination may be made based on the type of error that was reported by the core 102, based on the behavior, or lack of behavior, of the core 102 since the report, based on some other metric, or based on a combination thereof.

In some aspects, the external entity may set control information in the control register, which would then initiate a sequence in hardware logic to quiesce the core. In the example shown in FIG. 2, at block 212, the external entity 202 writes to the ExtQ CSR 110, e.g., in order to trigger circuitry within the core 102 that can perform tasks involved with quiescing the core 102. In the example shown in FIG. 2, at block 214, the ExtQ CSR 110 generates an ExtQ request into the core 102.

In the example shown in FIG. 2, at block 216, in response to receiving the ExtQ request, circuitry within the core 102 performs steps to quiesce the core 102. In some aspects, the circuitry with the core 102 may be substantially identical to what a conventional core uses to synchronously quiesce itself. For example, a conventional synchronous offlining flow may comprise a set of instructions that, when executed by a functioning core, set or clear bits in a control register, which sets internal signal values that trigger circuits within the core to go to a particular state, that drive one or more finite state machines (FSMs) to particular states (which may be through a sequence of states to get there), and so on. In this scenario, an ExtQ request may directly force those bits to the desired state and thus trigger the signals, FSM, etc., without requiring the CPU of the core to actually perform the corresponding write operation. In this example, the ExtQ request may be implemented as a non-maskable signal or control input into the core circuitry.

In the example shown in FIG. 2, the core 102 may then perform tasks to gracefully detach the core 102 from the SCN 204. For example, at block 218, the core 102 may take steps to clean cache entries and to detach the core 102 from the SCN 204. FIG. 2 is illustrative and not limiting: different tasks and/or other tasks not shown in FIG. 2 may be performed as part of the quiescing process. In the example shown in FIG. 2, at block 220, the core 102 indicates that it has completed the quiescing process by updating bits in the ExtQ CSR 110.

In some aspects, the external entity may wait for a status information update to indicate that the core 102 has been quiesced. In the example shown in FIG. 2, at block 222, the external entity 202 then reads or polls the ExtQ CSR 110 to determine whether or not the core 102 has been successfully quiesced. In the example shown in FIG. 2, this occurs after the quiescing has completed, but it will be understood that in some circumstances the external entity 202 may check the ExtQ CSR 110 before the quiescing is complete, in which case the external entity 202 may wait for some duration of time before checking the ExtQ CSR 110 again. In some aspects, the external entity 202 may periodically repeat this check until it has detected, based on contents of the ExtQ CSR 110, that the core 102 is quiesced.

Once the core 102 is quiesced, the external entity 202 could proceed with any further actions, such as dynamically removing the core from the scheduling core pool maintained by the OS (e.g., core hot unplug). In some cases (e.g., based on the type and severity of the error encountered), it may be possible to reinitialize and recover the core (e.g., core hot plug), adding it back to the scheduling core pool. For example, a register file parity error caused by a transient event, such as an alpha particle hit, doesn't produce a permanent error or fault condition, and so there is a higher likelihood that the affected core 102 may be safely brought back online. In some aspects, once the core is quiesced, having flushed all uncorrupted dirty state from the core, the OS or other software may be able to determine whether any other thread/core may have been impacted (e.g., by a corrupted tag) based on the remaining snoop filter state at the point of coherency. In some aspects, if other cores 102 are determined to be affected, the OS or other software may decide whether or not to trigger an external quiesce for (and possible later restart of) the other affected core(s) 102. In some aspects, if other cores 102 are affected, the OS or other software may treat this a system fatal error; otherwise, the software may choose to attempt to restart the thread and recover. In some aspects, firmware may probe the health and analyze the quiesced core 102 once it is quiesced to determine if the quiesced core 102 is a candidate for recovery (e.g., re-run memory built-in self-test (BIST) and/or run an isolated core test to check the health of the core).

Figure 3A:
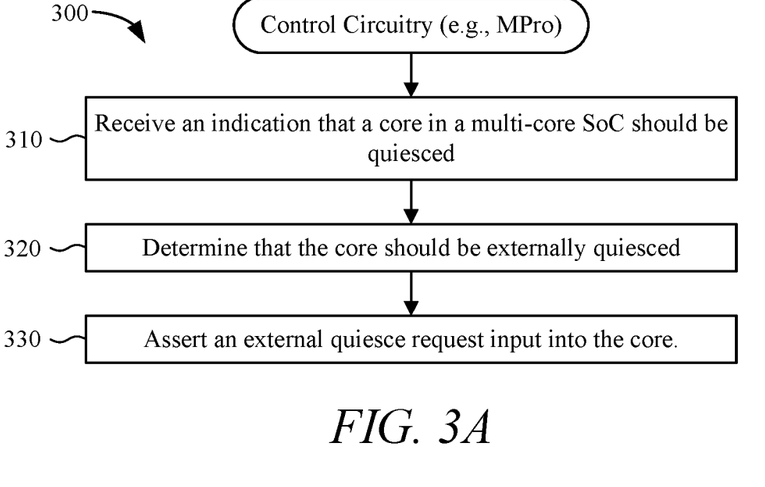
FIG. 3A and FIG. 3B are flowcharts showing portions of an example process associated with external quiesce of a core in a multi-core system, according to aspects of the disclosure.
Figure 3B:
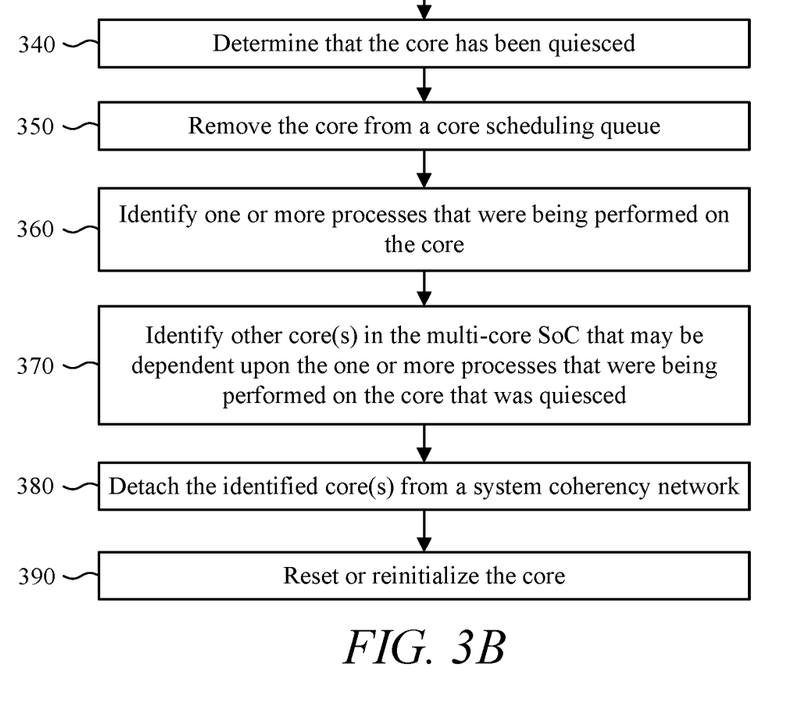

FIG. 3A and FIG. 3B are flowcharts showing portions of an example process 300 associated with external quiesce of a core in a multi-core system, according to aspects of the disclosure. In some aspects, one or more process blocks of FIGS. 3A and 3B may be performed by one or more components of an SoC, such as processor(s), memory, or other circuitry, any or all of which may be means for performing the operations of process 300. For example, in some aspects, one or more process blocks of FIGS. 3A and 3B may be performed by control circuitry for an SoC (e.g., SoC 100), such as the MPro 116.

As shown in FIG. 3A, at block 310, process 300 may include receiving, from a core in a multi-core SoC, an indication that a core in a multi-core SoC should be quiesced. In some aspects, this may comprise receiving an indication that there was a core error or other triggering event. For example, the MPro 116 may receive an error or trigger indication from one of the cores 102. In some aspects, receiving the indication comprises receiving the indication from the core (e.g., the core 102 having the error) or from circuitry that communicates with the core (e.g., another core 102 or other component within the SoC 100). In some aspects, receiving the indication comprises receiving the indication as a message on a communications interface (e.g., through the mesh interconnect 112), as an asserted input signal (e.g., directly from the CCM 104 to the MPro 116), or by reading a status register associated with the core 102 and determining that the status indicates an error or trigger condition.

As further shown in FIG. 3A, at block 320, process 300 may include determining that the core should be externally quiesced. For example, the MPro 116 may make this determination. In some aspects, such as where the indication that the core should be quiesced comprises an indication of a core error, for example, determining that the core should be externally quiesced comprises determining that the core should be quiesced based on a severity of the error, a frequency of receiving the error, or a combination thereof. In some aspects, determining that the core should be externally quiesced comprises determining that the core should be externally quiesced based on an indication that the core is no longer operating or is non-responsive.

As further shown in FIG. 3A, at block 330, process 300 may include asserting an external quiesce request input into the core. For example, the MPro 116 may assert this request. In some aspects, asserting the external quiesce request input into the core comprises asserting a signal on an input to the core or writing to a control and/or status register within the core.

As shown in FIG. 3B, at block 340, process 300 may include determining that the core has been quiesced. For example, the MPro 116 may make this determination. In some aspects, determining that the core has been quiesced comprises detecting a signal on an output from the core or reading a control and/or status register within the core.

As further shown in FIG. 3B, at block 350, process 300 may include removing the core from a core scheduling queue. In some aspects, the core scheduling queue may be maintained by the OS. For example, the MPro 116 may signal the OS to remove the failed core 102 from its core scheduling queue.

As further shown in FIG. 3B, at block 360, process 300 may include identifying one or more processes (e.g., virtual machines (VMs), threads, etc.) that were being performed on the core. In some aspects, this may be performed by the MPro 116, the OS, some other hardware, software, or firmware component of the SoC 100, or a combination thereof.

As further shown in FIG. 3B, at block 370, process 300 may include identifying one or more other cores in the multi-core SoC that may be dependent upon the one or more processes that were being performed on the core.

As further shown in FIG. 3B, at block 380, process 300 may include detaching the identified one or more other cores from a system coherency network. For example, where cache entries are identified as being associated with the core to be quiesced, those cache entries may be cleared or flushed.

As further shown in FIG. 3B, at block 390, process 300 may include resetting or reinitializing the core. In some aspects, resetting or reinitializing the core comprises causing the core to perform a built-in self-test (BIST) to verify proper operation of the core and its components. In some aspects, the core may be reset or reinitialized if the BIST passes, but left in a quiescent state if the BIST fails.

Process 300 may include additional implementations, such as any single implementation or any combination of implementations described below and/or in connection with one or more other processes described elsewhere herein. Although FIGS. 3A and 3B show example blocks of process 300, in some implementations, process 300 may include additional blocks, fewer blocks, different blocks, or differently arranged blocks than those depicted in FIGS. 3A and 3B. Additionally, or alternatively, two or more of the blocks of process 300 may be performed in parallel.

Figure 4A:
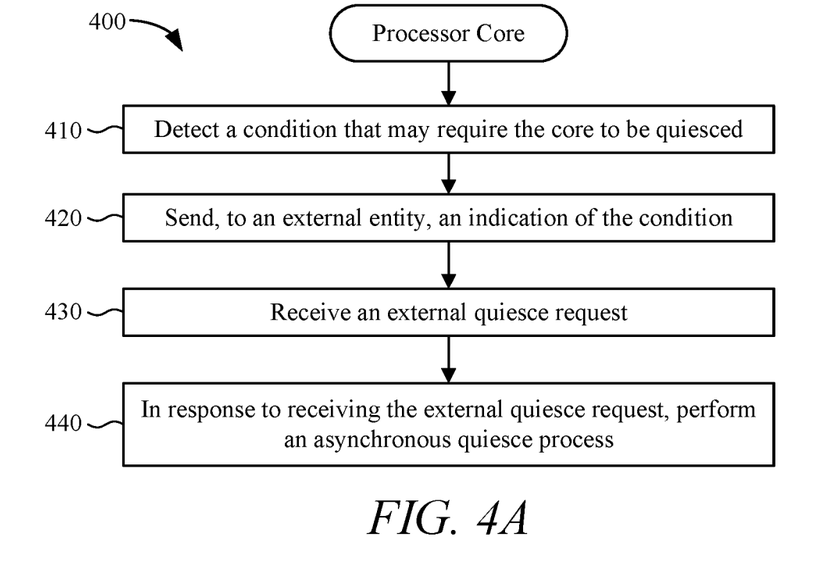
FIG. 4A and FIG. 4B are flowcharts showing portions of an example process 400 associated with external quiesce of a core in a multi-core system.
Figure 4B:
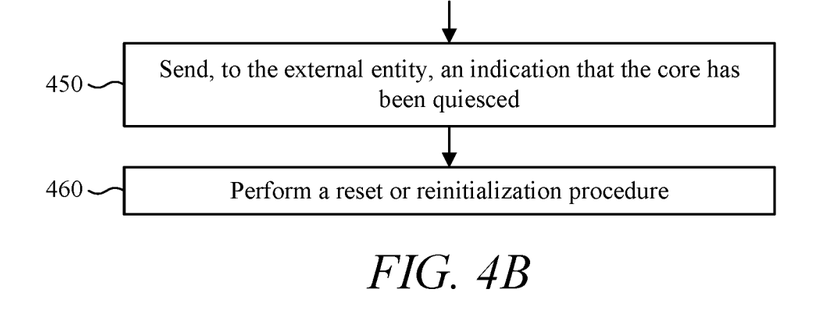

FIG. 4A and FIG. 4B are flowcharts showing portions of an example process 400 associated with external quiesce of a core in a multi-core system. In some implementations, one or more process blocks of FIGS. 4A and 4B may be performed by a core 102 within an SoC 100. Additionally, or alternatively, one or more process blocks of FIGS. 4A and 4B may be performed by one or more components of the core 102, such as a processor(s), memory, or transceiver(s), any or all of which may be means for performing the operations of process 400.

As shown in FIG. 4A, at block 410, process 400 may include detecting an a condition that may require the core to be quiesced, and at block 420, process 400 may include sending, to an external entity, an indication of the condition. For example, a core 102 may detect a memory parity error and notify the MPro 116 of this fact. In some aspects, sending the indication of the error condition comprises sending the indication as a message on a communications interface (e.g., via the mesh interconnect 112), asserting an output signal from the core (e.g., through the CCM 104 and directly into the MPro 116), or updating a register in the core 102 or in the CCM 104 that is monitored by the external entity, such as writing a value to the ExtQ CSR 108, that is later read by the MPro 116.

As further shown in FIG. 4A, at block 430, process 400 may include receiving an external quiesce request. For example, the core 102 may receive an external quiesce request from the MPro 116 via the mesh interconnect 112 and the CCM 104. In some aspects, receiving the external quiesce request comprises detecting assertion of an input signal into the core or detecting that a value was written to a control and/or status register within the core. For example, the MPro 116 may write data to the ExtQ CSR 110, which triggers a hardware signal into the core 102.

As further shown in FIG. 4A, at block 440, process 400 may include performing an asynchronous quiesce process in response to receiving the external quiesce request. For example, when the core 102 receives the external quiesce request, this may trigger circuitry within the core 102 to perform a number of tasks that are related to off-lining the core 102. It is noted that in some aspects, these tasks may be performed even when the core 102 CPU is not operative, e.g., by dedicated logic, finite state machines, or other circuitry. In some aspects, performing the asynchronous quiesce process may comprise at least one of cleaning or flushing at least one cache associated with the core, or detaching the core from a system coherency network.

As shown in FIG. 4B, at block 450, process 400 may include sending, to the external entity, an indication that the core has been quiesced. For example, a core 102 may write a bit to the ExtQ CSR 110, which the MPro 116 may later poll. Alternatively, core 102 may assert a signal that is output by the core 102 and input to the MPro 116.

As further shown in FIG. 4B, at block 460, process 400 may include performing a reset or reinitialization procedure. In some aspects, performing the reset or reinitialization procedure comprises performing a built-in self-test (BIST) to verify proper operation of a component of the core. In some aspects, the BIST results are analyzed to determine whether to proceed with the reset or reinitialization procedure to bring the core 102 back on-line (e.g., if the BIST passes) or to remove the core 102 from the pool (e.g., if the BIST fails).

Process 400 may include additional implementations, such as any single implementation or any combination of implementations described below and/or in connection with one or more other processes described elsewhere herein. Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

In some aspects, an external quiesce can be configured to be taken precisely (e.g., only if the core 102 is at a "safe point", such as between atomic operations), or it can be configured to be taken imprecisely (e.g., even if core 102 may have been in-between an operation when stuck). In some aspects, if the external quiesce is configured to be taken precisely and core is not at a safe point, the core 102 will not be able to complete the quiesce process. For example, if the core 102 suffers another error when cleaning the caches as part of the quiesce process, then the core 102 might not be able to complete the entire quiesce process. In some aspects, if the external quiesce is configured to be taken imprecisely, then the core would be forced to complete the quiesce process regardless of what additional errors might occur during that quiesce process.

External quiesce provides a number of technical advantages, including but not limited to the following. The external quiesce sequence results in a safe removal of a core from the coherent domain after a successful cleanup. This safe removal allows the reset and restart of a single core (e.g., a single virtual machine) instead of a complete system shutdown in case of core error. This feature provides error containment mechanisms to the processor complex subsystem, where the containment is in the context of a core and its own local caches and logic. An important aspect of containing errors is having a mechanism and process for recovery so that resources may be reclaimed once the error has been identified and contained. The external quiesce feature provides that recovery mechanism so that system may continue to run at full capacity on non-affected cores without having to reboot the entire system. As core count per node increases exponentially, the "blast radius" (e.g., the number of VMs impacted) by a fatal core error becomes more and more costly. In some fatal core error scenarios (e.g., register file parity), external quiesce can be used to eliminate the impact by recovering and reclaiming the core for continued usage by the node. This may also be useful debug feature using debug tools in certain scenarios (e.g., during testing, resetting and recovering hung cores).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC.

Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to,"

"instructions that when executed perform," "computer instructions to," and/or other structural components configured to perform the described action.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for external quiesce of a core in a multi-core system-on-chip (SoC), the method comprising, at control circuitry for the multi-core SoC: receiving an indication that the core in the multi-core SoC should be quiesced, which comprises writing back dirty cache data and detaching the core from a coherency network; determining that the core is unable to execute instructions and cannot quiesce itself, and should be externally quiesced; and asserting an external quiesce request input into the core to trigger an asynchronous quiesce process that operates even if the core is unable to execute instructions.

2. The method of claim 1, wherein receiving the indication that the core should be quiesced comprises receiving the indication from the core or from circuitry that communicates with the core.

3. The method of claim 1, wherein receiving the indication that the core should be quiesced comprises receiving the indication as a message on a communications interface, receiving an asserted input signal, or reading a status register associated with the core.

4. The method of claim 1, wherein receiving the indication that the core should be quiesced comprises receiving an indication of a core error and wherein determining that the core should be externally quiesced comprises determining that the core should be externally quiesced based on a severity of the core error, a frequency of receiving the core error, or a combination thereof.

5. The method of claim 1, wherein determining that the core should be externally quiesced comprises determining that the core should be externally quiesced based on an indication that the core is no longer operating or is non-responsive.

6. The method of claim 1, wherein asserting the external quiesce request input into the core comprises asserting a signal on an input to the core or writing to a control and/or status register within the core.

7. The method of claim 1, further comprising:
determining that the core has been quiesced; and
removing the core from a core scheduling queue.

8. The method of claim 7, wherein determining that the core has been quiesced comprises detecting a signal on an output from the core or reading a control and/or status register within the core.

9. The method of claim 7, further comprising:
identifying one or more processes that were being performed on the core;
identifying one or more other cores in the multi-core SoC that may be dependent upon the one or more processes that were being performed on the core; and
detaching the one or more other cores from a system coherency network.

10. The method of claim 7, further comprising resetting or reinitializing the core.

11. The method of claim 10, wherein resetting or reinitializing the core comprises causing the core to perform a built-in self-test (BIST) to verify proper operation of a component of the core.

12. A method for external quiesce of a core in a multi-core system-on-chip (SoC), the method comprising, at the core in the multi-core SoC: detecting a condition that may require the core to be quiesced, which comprises writing back dirty cache data and detaching the core from a coherency network; providing, to an external entity, an indication of the condition; receiving an external quiesce request to trigger an asynchronous quiesce process that operates to write back dirty cache data and detach the core from the coherency network even if the core is unable to execute instructions; and in response to receiving the external quiesce request, performing the asynchronous quiesce process that operates to write back dirty cache data and detach the core from the coherency network even if the core is unable to execute instructions.

13. The method of claim 12, wherein providing the indication of the condition comprises sending the indication as a message on a communications interface, asserting an output signal from the core, or writing to a status register associated with the core.

14. The method of claim 12, wherein receiving the external quiesce request comprises detecting assertion of an input signal into the core or detecting that a value was written to a control and/or status register within the core.

15. The method of claim 12, wherein performing the asynchronous quiesce process comprises at least one of:
cleaning or flushing at least one cache associated with the core; and
detaching the core from a system coherency network.

16. The method of claim 12, further comprising providing, to the external entity, an indication that the core has been quiesced.

17. The method of claim 12, further comprising performing a reset or reinitialization procedure.

18. The method of claim 17, wherein performing the reset or reinitialization procedure comprises performing a built-in self-test (BIST) to verify proper operation of a component of the core.

19. An apparatus for external quiesce of a core in a multi-core system-on-chip (SoC), the apparatus comprising: a plurality of processor cores; control circuitry for performing a control function; and a mesh interconnect communicatively coupled to the plurality of processor cores and the control circuitry; wherein the control circuitry is configured to: receive an indication that the core from the plurality of processor cores should be quiesced, which comprises writing back dirty cache data and detaching the core from a coherency network; determine that the core is unable to execute instructions and cannot quiesce itself, and should be externally quiesced; and assert an external quiesce request input into the core to trigger an asynchronous quiesce process that operates to write back dirty cache data and detach the core from the coherency network even if the core is unable to execute instructions.

20. The apparatus of claim 19, wherein the control circuitry is configured to receive the indication that the core should be quiesced from the core or from circuitry that communicates with the core.

21. The apparatus of claim 19, wherein the control circuitry is configured to receive the indication that the core should be quiesced as a message on a communications interface, as an asserted input signal, or by reading a control and/or status register associated with the core.

22. The apparatus of claim 19, wherein the indication that the core should be quiesced comprises an indication of a core error and wherein the control circuitry is configured to determine that the core should be externally quiesced based on a severity of the core error, a frequency of receiving the core error, or a combination thereof.

23. The apparatus of claim 19, wherein the control circuitry is configured to determine that the core should be externally quiesced based on an indication that the core is no longer operating or is non-responsive.

24. The apparatus of claim 19, wherein, to assert the external quiesce request input into the core, the control circuitry is configured to assert a signal on an input to the core or to write to a control and/or status register associated with the core.

25. The apparatus of claim 19, wherein the control circuitry is further configured to:
determine that the core has been quiesced; and
remove the core from a core scheduling queue.

26. The apparatus of claim 25, wherein, to determine that the core has been quiesced, the control circuitry is configured to detect a signal on an output from the core, or to read a control and/or status register associated with the core.

27. The apparatus of claim 25, wherein the control circuitry is further configured to:
identify one or more processes that were being performed on the core;
identify one or more other cores in the multi-core SoC that may be dependent upon the one or more processes that were being performed on the core; and
detach the one or more other cores from a system coherency network.

28. The apparatus of claim 25, wherein the control circuitry is further configured to reset or reinitialize the core.

29. The apparatus of claim 28, wherein to reset or reinitialize the core, the control circuitry is configured to cause the core to perform a built-in self-test (BIST) to verify proper operation of a component of the core.

30. An apparatus for external quiesce of a core in a multi-core system-on-chip (SoC), the apparatus comprising: a plurality of processor cores; control circuitry for performing a control function; and a mesh interconnect communicatively coupled to the plurality of processor cores and the control circuitry; wherein the core of the plurality of processor cores is configured to: detect a condition that may require the core to be quiesced, which comprises writing back dirty cache data and detaching the core from a coherency network; provide, to the control circuitry, an indication of the condition; receive an external quiesce request to trigger an asynchronous quiesce process that operates to write back dirty cache data and detach the core from the coherency network even if the core is unable to execute instructions; and in response to receiving the external quiesce request, perform the asynchronous quiesce process that operates to write back dirty cache data and detach the core from the coherency network even if the core is unable to execute instructions.

31. The apparatus of claim 30, wherein, to provide the indication of the condition, the core is configured to send the indication as a message on a communications interface, to assert an output signal from the core, or to update a status register associated with the core.

32. The apparatus of claim 30, wherein, to receive the external quiesce request, the core is configured to detect assertion of an input signal into the core or to detect that a value was written to a control and/or status register within the core.

33. The apparatus of claim 30, wherein, to perform the asynchronous quiesce process, the core is configured to at least one of:
clean or flush at least one cache associated with the core; and
detach the core from a system coherency network.

34. The apparatus of claim 30, wherein the core is further configured to provide, to the control circuitry, an indication that the core has been quiesced.

35. The apparatus of claim 30, wherein the core is further configured to perform a reset or reinitialization procedure.

36. The apparatus of claim 35, wherein, to perform the reset or reinitialization procedure, the core is configured to perform a built-in self-test (BIST) to verify proper operation of a component of the core.

* * * * *